US012640963B2

(12) United States Patent
Lim et al.

(10) Patent No.: US 12,640,963 B2
(45) Date of Patent: May 26, 2026

(54) FREQUENCY AND POWER MODULATION RADIO FREQUENCY (RF) GENERATOR

(71) Applicant: Samsung Electronics Co., Ltd., Suwon-si (KR)

(72) Inventors: Sungyong Lim, Suwon-si (KR); Yongwon Cho, Suwon-si (KR); Hwasoo Seok, Suwon-si (KR); Kyungsun Kim, Suwon-si (KR); Sungyeol Kim, Suwon-si (KR); Donghyeon Na, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/945,605

(22) Filed: Nov. 13, 2024

(65) Prior Publication Data

US 2025/0337619 A1 Oct. 30, 2025

(30) Foreign Application Priority Data

Apr. 24, 2024 (KR) ........................ 10-2024-0054989

(51) Int. Cl.
*H04L 25/03* (2006.01)

(52) U.S. Cl.
CPC .. *H04L 25/03006* (2013.01); *H04L 25/03847* (2013.01); *H04L 2025/03363* (2013.01)

(58) Field of Classification Search
CPC ......... H04L 25/03006; H04L 25/03847; H04L 2025/03363; H01J 37/32174; H01J 37/32155; H01J 37/32091; H01J 37/321

USPC ........................................................ 375/262
See application file for complete search history.

(56) References Cited

U.S. PATENT DOCUMENTS

| | | | |
|---|---|---|---|
| 6,792,282 B1 * | 9/2004 | Domino ............... | H03G 3/3047 |
| | | | 455/102 |
| 9,755,576 B2 | 9/2017 | Perreault et al. | |
| 10,638,593 B2 | 4/2020 | Long et al. | |
| 10,903,049 B2 | 1/2021 | Higuchi | |
| 11,049,693 B2 | 6/2021 | Shoeb et al. | |
| 11,456,154 B2 | 9/2022 | Park et al. | |
| 11,808,690 B2 | 11/2023 | Lin et al. | |
| 2010/0296977 A1 * | 11/2010 | Hancock ................... | A61L 2/24 |
| | | | 422/186 |
| 2021/0210314 A1 | 7/2021 | Wang et al. | |
| 2023/0050119 A1 | 2/2023 | Martinez et al. | |
| 2023/0124201 A1 | 4/2023 | Shoeb et al. | |

(Continued)

FOREIGN PATENT DOCUMENTS

| | | |
|---|---|---|
| KR | 10-2023-0022365 A | 2/2023 |
| KR | 10-2023-0110342 A | 7/2023 |

*Primary Examiner* — Fitwi Y Hailegiorgis
(74) *Attorney, Agent, or Firm* — Muir Patent Law, PLLC

(57) ABSTRACT

A frequency and power modulation radio frequency (RF) generator includes a first frequency and power modulation RF generator including a signal generator configured to generate an RF signal, an amplifier configured to amplify power of the RF signal from the signal generator, and a phase controlled power correction (PCPC) circuit configured to control a phase of the RF signal amplified by the amplifier. The signal generator, the amplifier, and the PCPC circuit are controlled to perform multi-level pulsing and frequency modulation on the RF signal, thereby supplying RF power of the RF signal to a chamber. The multi-level pulsing has pulse forms with different power levels.

20 Claims, 24 Drawing Sheets

(56) References Cited

U.S. PATENT DOCUMENTS

| 2023/0187175 | A1 | 6/2023 | Kim et al. |
| 2023/0230804 | A1 | 7/2023 | Bhowmick et al. |
| 2024/0321553 | A1 | 9/2024 | Grede et al. |

* cited by examiner 110          130          150                    200

FPMRFG
(100)

FREQUENCY AND POWER MODULATION RADIO FREQUENCY (RF) GENERATOR

CROSS-REFERENCE TO RELATED APPLICATION

This application is based on and claims priority under 35 U.S.C. § 119 to Korean Patent Application No. 10-2024-0054989, filed on Apr. 24, 2024, in the Korean Intellectual Property Office, the disclosure of which is incorporated by reference herein in its entirety.

BACKGROUND

The inventive concept relates to a radio frequency (RF) generator, and more particularly, to an RF generator configured to supply RF power to a chamber in equipment that uses RF plasma.

In general, to fabricate semiconductor devices, a series of processes, such as deposition, etching, and cleaning, may be performed. Such processes may be performed by deposition, etching, or cleaning apparatuses, which include chambers. To improve selectivity and minimize damage to films, plasma technologies, such as capacitively coupled plasma (CCP), inductively coupled plasma (ICP), or a mixture of CCP and ICP, have been used. In such technologies using CCP, ICP or a mixture of CCP and ICP, RF power may be supplied to chambers to generate plasma.

SUMMARY

The inventive concept provides a radio frequency (RF) generator capable of improving the uniformity of plasma in a chamber and increasing the efficiency of generation of radicals.

The inventive concept is not limited to the above aspects, and the above and other aspects of the inventive concept will be clearly understood by those of ordinary skill in the art from the following description.

According to an embodiment of the present disclosure, a frequency and power modulation radio frequency (RF) generator includes a first frequency and power modulation RF generator including a signal generator configured to generate an RF signal, an amplifier configured to amplify power of the RF signal from the signal generator, and a phase controlled power correction (PCPC) circuit configured to control a phase of the RF signal amplified by the amplifier. The signal generator, the amplifier, and the PCPC circuit are controlled to perform multi-level pulsing and frequency modulation on the RF signal, thereby supplying RF power of the RF signal to a chamber. The multi-level pulsing has pulse forms with different power levels.

According to an aspect of the present disclosure, a frequency and power modulation radio frequency (RF) generator includes a controller configured to generate a control signal, a signal generator configured to generate an RF signal according to the control signal of the controller, an amplifier configured to amplify power of the RF signal from the signal generator according to a gain information of the control signal of the controller, a phase controlled power correction (PCPC) circuit configured to control a phase of the RF signal amplified by the amplifier, and a sensor arranged between the amplifier and the PCPC circuit and configured to detect a phase difference between a voltage of the RF signal and a current thereof. The controller is configured to cause the signal generator, the amplifier, and the PCPC circuit to perform multi-level pulsing and frequency modulation on the RF signal.

According to an aspect of the present disclosure, plasma equipment includes a chamber, and a first frequency and power modulation radio frequency (RF) generator connected to the chamber. The first frequency and power modulation RF generator includes a controller configured to generate a control signal, a signal generator configured to generate an RF signal according to the control signal of the controller, an amplifier configured to amplify power of the RF signal from the signal generator according to a gain information of the control signal of the controller, a phase controlled power correction (PCPC) circuit comprising a capacitor, an inductor, and a switch and configured to control a voltage and a current of the RF signal, which is amplified by the amplifier, to have a same phase, and a sensor arranged between the amplifier and the PCPC circuit and configured to detect a phase difference between the voltage and the current. The controller is configured to cause the signal generator, the amplifier, and the PCPC circuit to perform multi-level pulsing and frequency modulation on the RF signal, thereby supplying RF power of the RF signal to the chamber.

BRIEF DESCRIPTION OF THE DRAWINGS

Embodiments will be more clearly understood from the following detailed description taken in conjunction with the accompanying drawings in which.

DETAILED DESCRIPTION OF THE EMBODIMENTS

Figure 1:
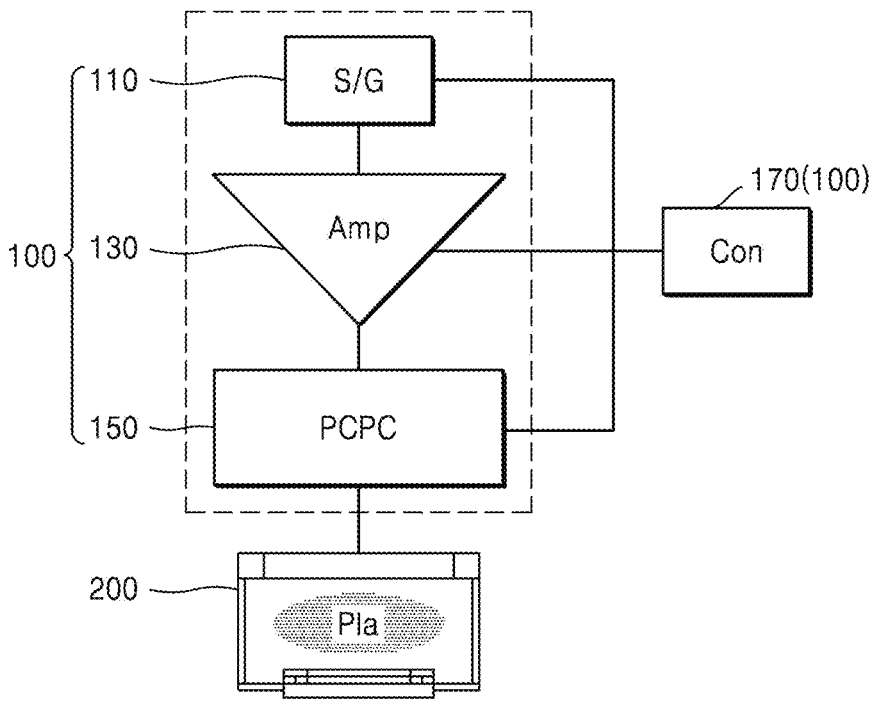
FIG. 1 is a configuration diagram of a frequency and power modulation radio frequency (RF) generator according to an embodiment.

Hereinafter, embodiments of the inventive concept will be described in detail with reference to the accompanying drawings. Like components are denoted by like reference numerals throughout the specification, and repeated descriptions thereof are omitted.

FIG. 1 is a configuration diagram of a frequency and power modulation radio frequency (RF) generator according to an embodiment.

Referring to FIG. 1, the frequency and power modulation RF generator (FPMRFG) 100 of the present embodiment may generate an RF signal and supply RF power to a chamber 200. Here, the chamber 200 is a chamber for a plasma process and may also be referred to as a plasma chamber. In a plasma process, plasma Pla may be generated in the chamber 200. In the FPMRFG 100 of the present embodiment, the chamber 200 may include an inductively coupled plasma (ICP) chamber. However, in some embodiments, the chamber 200 may include a capacitively coupled plasma (CCP) chamber or a chamber in which CCP and ICP are combined. For reference, depending on types of chambers and types of RF power applied to chambers, plasma processes may be classified into CCP types, ICP types, and CCP and ICP-combined types. The FPMRFG 100 of the present embodiment may be applied to, for example, an ICP-type plasma process. However, the inventive concept is not limited thereto, and the FPMRFG 100 may also be applied to CCP-type plasma processes or CCP and ICP-combined-type plasma processes.

The FPMRFG 100 of the present embodiment may include a signal generator 110, an amplifier 130, a phase controlled power correction (PCPC) unit 150 (i.e., a PCPC circuit), and a controller 170.

The signal generator 110 may generate an RF signal. In addition, the signal generator 110 may generate RF signals having a plurality of frequencies. For example, the signal generator 110 may generate RF signals having different frequencies, such as a first RF signal having a first frequency, a second RF signal having a second frequency, and a third RF signal having a third frequency.

The amplifier 130 may amplify power of the RF signal that is output from the signal generator 110.

The PCPC unit 150 may control a phase of the RF signal amplified by the amplifier 130. For example, the PCPC unit 150 may control the phase of the RF signal and thus cause a voltage and a current of the RF signal to be in-phase. The PCPC unit 150 may include a capacitor, an inductor, and a switch. The PCPC unit 150 may cause the voltage and the current of the RF signal applied to the chamber 200 to be in-phase through the adjustment of the respective capacitances of the capacitor and the inductor and an ON/OFF operation of the switch. For example, the effective capacitance of the capacitance and the effective inductance of the inductor may be adjusted by an ON/OFF operation of the switches.

Figure 5:
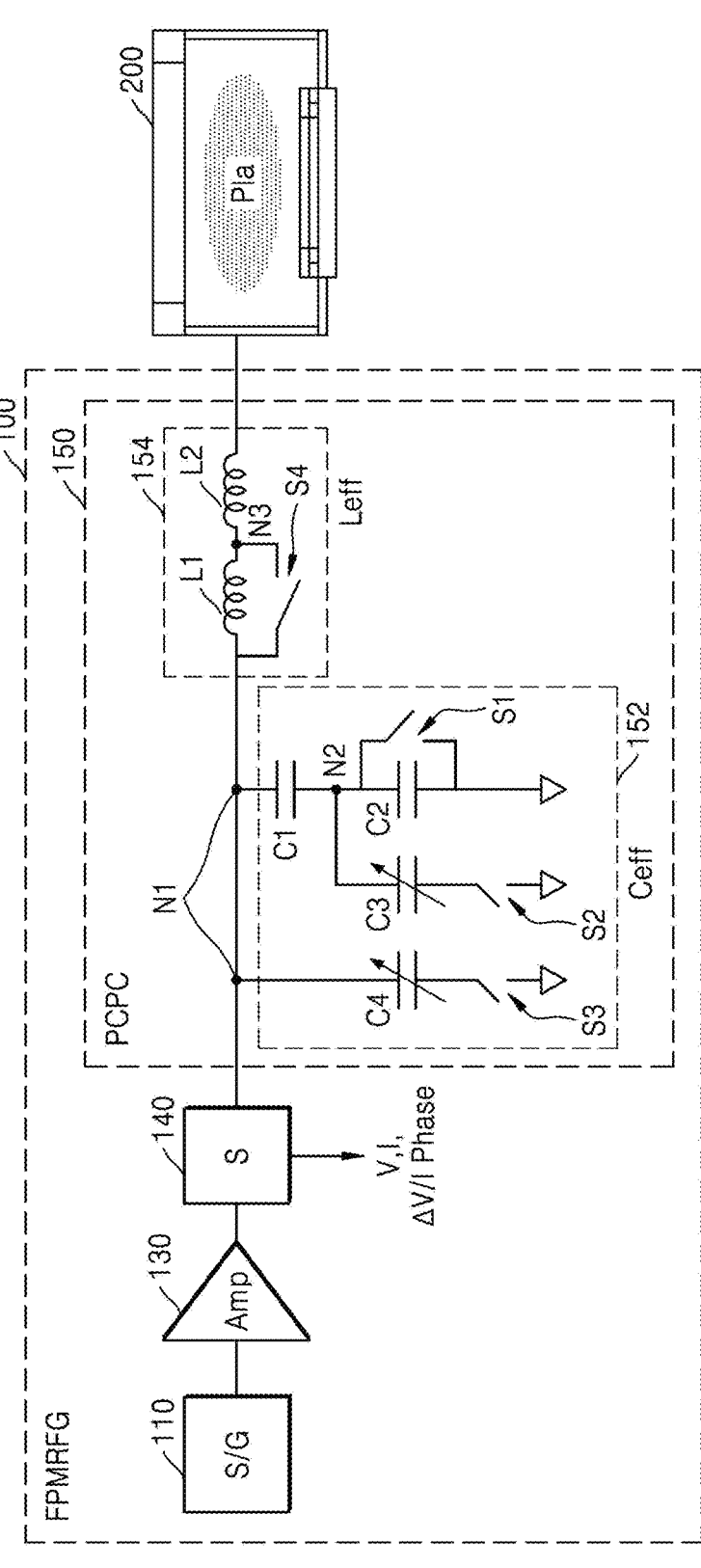
FIG. 5 is a circuit diagram illustrating, in detail, a portion of a phase controlled power correction (PCPC) unit in the frequency and power modulation RF generator of FIG. 1.

The PCPC unit 150 may include, for example, a capacitor unit (see 152 of FIG. 5) and an inductor unit (see 154 of FIG. 5). Circuit configurations and operations of the capacitor unit 152 and the inductor unit 154 are described in detail with reference to FIG. 5 and FIGS. 9A and 9B, and 10A to 10D.

The controller 170 may control the components in the FPMRFG 100. For example, the controller 170 may generate control signals having set values and may transfer the control signals to components corresponding thereto to control the corresponding components. Specifically, the controller 170 may generate control signals each including one or more pieces of waveform information, such as a phase, a frequency, an amplitude, and a gain. Accordingly, the signal generator 110 may receive a control signal for an RF signal, for example, a control signal including a phase, a frequency, or an amplitude of the RF signal, from the controller 170 and may generate the RF signal having a waveform corresponding thereto. In addition, the amplifier 130 may receive, from the controller 170, a control signal including information regarding a gain of the amplifier 130 and may amplify the RF signal according to the control signal regarding the gain. The PCPC unit 150 may receive, from the controller 170, a control signal including information, such as variable capacitance or switch ON/OFF. The PCPC unit 150 may cause the voltage and the current of the RF signal supplied to the chamber 200 to be in-phase by adjusting the capacitance of a variable capacitor and ON/OFF of the switch according to the control signal.

Although not shown in FIG. 1, the FPMRFG 100 of the present embodiment may further include a sensor (see 140 of FIG. 5) arranged between the amplifier 130 and the PCPC unit 150. The sensor 140 may sense the voltage and the current of the RF signal and thus measure a phase difference between the voltage and the current. The sensor 140 is described in more detail with reference to FIG. 5. In an embodiment, the sensor 140 may include a phase detector or a quadrature detector.

According to the FPMRFG 100 of the present embodiment, a plurality of FPMRFGs 100 may be connected to the chamber 200 and may supply a plurality of pieces of RF power to the chamber 200 rather than one FPMRFG 100 is connected to the chamber 200 and supplies RF power to the chamber 200. Hereinafter, a structure in which a plurality of FPMRFGs 100 are connected to the chamber 200, and waveforms of RF signals supplied to the chamber 200 are described with reference to FIGS. 2A and 2B.

The FPMRFG 100 of the present embodiment may perform multi-level pulsing and frequency modulation together on an RF signal and may supply RF power to the chamber 200. Here, the multi-level pulsing may refer to an operation of generating RF signals in the form of pulses having different power levels. The FPMRFG 100 of the present embodiment may supply RF power to the chamber 200 by performing both multi-level pulsing and frequency modulation together, thereby significantly improving the uniformity of plasma and the efficiency of generation of radicals in a plasma process. As such, the FPMRFG 100 of the present embodiment may use, as a control knob, the frequency modulation, which has not been used in general RF generators, of the RF signal, and thus, the FPMRFG 100 may maximize the process controllability in a plasma process.

For reference, the plasma Pla generated in a plasma process may include various components, such as ions, electrons, radicals, ultraviolet rays, and the like. At least one of the components, such as ions, electrons, radicals, ultraviolet rays, and the like, may be used for etching, deposition, or cleaning processes. Fundamentally, radicals may be electrically neutral and ions may be electrically polar. Therefore, in the case where the plasma Pla is used for an etching process, radicals may be used in isotropically etching an etching object, and ions may be used in anisotropically etching an etching object. Depending on the power and frequency of the RF signal supplied to the chamber 200, the proportions and spatial distributions of the components of the generated plasma Pla may vary. In addition, because the efficiency of generation of radicals relies on the ionization/dissociation rate, the ionization/dissociation rate may be controlled through the adjustment of the power and frequency of the RF signal, thereby improving the efficiency of generation of radicals.

Figure 2A:
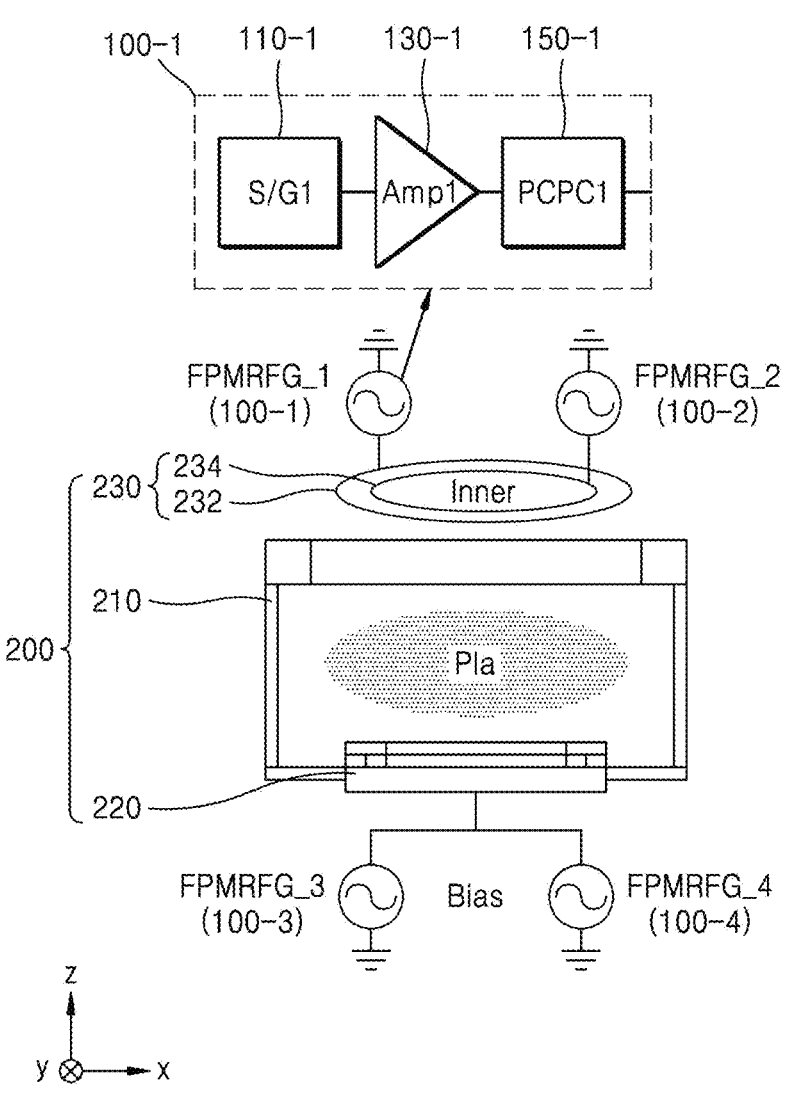
FIGS. 2A and 2B are respectively a configuration diagram of a chamber system, in which a plurality of frequency and power modulation RF generators are applied to a chamber, and a graph for RF signals supplied to the chamber, according to an embodiment.
Figure 2B:
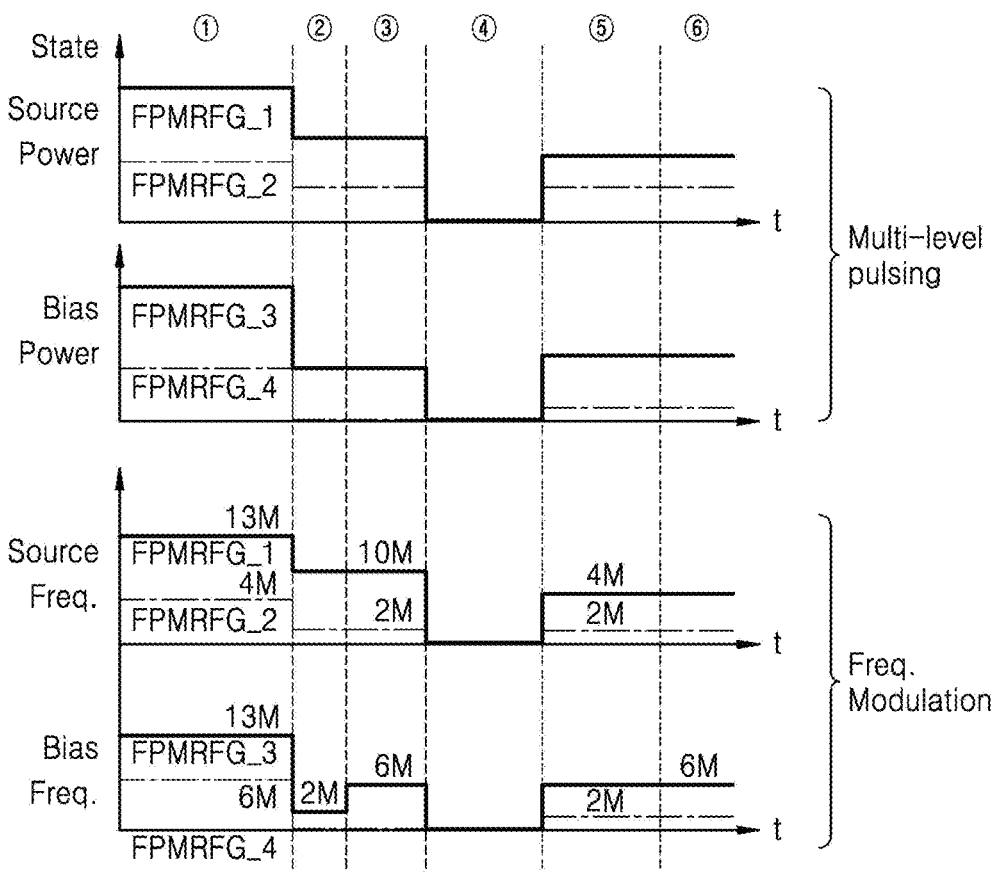

FIGS. 2A and 2B are respectively a configuration diagram of a chamber system, in which a plurality of FPMRFGs are applied to a chamber, and a graph for RF signals supplied to the chamber, according to an embodiment. In FIG. 2B, the x-axis represents time, and the y-axis represents power levels or frequency levels. Repeated descriptions given with reference to FIG. 1 are simplified or omitted.

Referring to FIG. 2A, the plurality of FPMRFGs according to the present embodiment may include first to fourth FPMRFGs 100-1 to 100-4. Specifically, the first FPMRFG (that is, "FPMRFG_1") 100-1 may be connected to an outer antenna 232 of the chamber 200 and may supply first RF power to the chamber 200. The second FPMRFG (that is, "FPMRFG_2") 100-2 may be connected to an inner antenna 234 of the chamber 200 and may supply second RF power to the chamber 200. The third FPMRFG (that is, "FPMRFG_3") 100-3 may be connected to an electrostatic chuck 220 of the chamber 200 and may supply first bias power to the chamber 200. The fourth FPMRFG (that is, "FPMRFG_4") 100-4 may be connected to the electrostatic chuck 220 of the chamber 200, in common with the third FPMRFG 100-3, and may supply second bias power to the chamber 200.

Each of the first to fourth FPMRFGs 100-1 to 100-4 may include a signal generator 110, an amplifier 130, a PCPC unit 150, and a controller 170. Although only a configuration diagram of the first FPMRFG 100-1 including a first signal generator 110-1, a first amplifier 130-1, and a first PCPC unit 150-1 is separately illustrated within the dashed quadrangle in FIG. 2A, each of the second to fourth FPMRFGs 100-2 to 100-4 may also include a signal generator 110, an amplifier 130, and a PCPC unit 150. While the controller 170 is not included in the configuration diagram of the first FPMRFG 100-1, in the plurality of FPMRFGs according to the present embodiment, one controller 170 may be provided in common, and all the first to fourth FPMRFGs 100-1 to 100-4 may be controlled by the one controller 170.

To briefly describe the chamber 200 that is an object to which RF power is supplied by the first to fourth FPMRFGs 100-1 to 100-4, the chamber 200 is a chamber for a plasma process, and the plasma Pla may be generated in the chamber 200. The chamber 200 may include a chamber body 210, the electrostatic chuck 220, and an antenna 230.

The chamber body 210 may define a reaction space, in which plasma is formed, and may seal the reaction space from the outside thereof. The chamber body 210 may be generally formed of a metal material and may be maintained in a grounded state to cut off noise from the outside thereof during a plasma process. Although not shown, a gas inlet, a gas outlet, a viewport, and the like may be formed in the chamber body 210. A process gas, which is required for a plasma process, may be supplied to the inside of the chamber 200 via the gas inlet. Here, the process gas may refer to all gases, such as a source gas, a reaction gas, and a purge gas, which are required for the plasma process. After the plasma process is completed, the gases in the chamber 200 may be discharged to the outside of the chamber 200 via the gas outlet. In addition, the pressure inside the chamber 200 may be adjusted by the gas outlet. One or more viewports may be formed in the chamber body 210, and the inside of the chamber 200 may be monitored via the viewports.

The electrostatic chuck 220 may be arranged in a lower portion of the chamber 200. A substrate, which is an object of a plasma process, may be arranged on and secured to the upper surface of the electrostatic chuck 220. The electrostatic chuck 220 may secure the substrate thereto by electrostatic force. The substrate may include, for example, a semiconductor substrate including a semiconductor material. However, the substrate is not limited to a semiconductor substrate.

The electrostatic chuck 220 may include, therein, a lower electrode for the plasma process. Power sources for applying bias power may be connected to the lower electrode. In the first to fourth FPMRFGs 100-1 to 100-4 of the present embodiment, the power sources for applying bias power may include, for example, the third FPMRFG 100-3 and the fourth FPMRFG 100-4. As described above, the third FPMRFG 100-3 may supply the first bias power to the chamber 200 via the lower electrode of the electrostatic chuck 220, and the fourth FPMRFG 100-4 may supply the second bias power to the chamber 200 via the lower electrode of the electrostatic chuck 220.

Although not shown, a showerhead may be arranged in an upper portion of the chamber 200. The showerhead may be connected to a process gas source via the gas inlet and a gas supply tube and may include a plurality of injection holes therein. Therefore, the showerhead may inject process gases, which are supplied from the process gas source via the gas inlet and the gas supply tube, to the inside of the chamber 200 via the plurality of injection holes.

The antenna 230 may be arranged in the upper portion of the chamber 200. For example, the antenna 230 may be arranged with a coil shape over the showerhead. Based on the coil shape, the antenna 230 may also be referred to as a coil antenna. Specifically, when the chamber 200 of FIG. 2A corresponds to a cross-section that is perpendicular to the y-axis, the antenna 230 may be arranged on an x-y plane of the upper portion of the chamber 200 while having a coil shape surrounding the center of the chamber 200.

The antenna 230 may include the outer antenna 232 and the inner antenna 234. Although the antenna 230 is arranged to be buried in the upper portion of the chamber 200, the antenna 230 is illustrated in an elliptical shape separately from the chamber body 210 for convenience in FIG. 2A. In FIG. 2A, the inner ellipse may correspond to the inner antenna 234, and the outer ellipse may correspond to the outer antenna 232. As described above, the first FPMRFG 100-1 may be connected to the outer antenna 232 and may supply the first RF power to the chamber 200 through the outer antenna 232, and the second FPMRFG 100-2 may be connected to the inner antenna 234 and may supply the second RF power to the chamber 200 through the inner antenna 234.

Referring to FIG. 2B, the graph at the top illustrates that the first FPMRFG 100-1 and the second FPMRFG 100-2 each supply RF power to the chamber 200 by multi-level pulsing. For example, the first FPMRFG 100-1 may supply, to the chamber 200, RF signals at three power levels, as indicated by a thick solid line. Specifically, RF power at a first level may be supplied in a first period (①), RF power at a second level may be supplied in a second period (②) and a third period (③), RF power at a third level may be supplied in a fifth period (⑤) and a sixth period (⑥), and no RF power may be supplied in a fourth period (④).

The second FPMRFG 100-2 may supply, to the chamber 200, RF signals at two power levels, as indicated by a dash-dotted line. Specifically, RF power at a first level may be supplied in the first period (①), RF power at a second level may be supplied in the second period (②) and the third period (③), and RF power at the second level may also be supplied in the fifth period (⑤) and the sixth period (⑥). In addition, no RF power may be supplied in the fourth period (④).

The second graph from the top illustrates that the third FPMRFG 100-3 and the fourth FPMRFG 100-4 each supply bias power to the chamber 200 by multi-level pulsing. For example, the third FPMRFG 100-3 may supply, to the chamber 200, bias signals at three power levels, as indicated by a thick solid line. Specifically, bias power at a first level may be supplied in the first period (①), bias power at a second level may be supplied in the second period (②) and the third period (③), bias power at a third level may be supplied in the fifth period (⑤) and the sixth period (⑥), and no bias power may be supplied in the fourth period (④).

The fourth FPMRFG 100-4 may supply, to the chamber 200, bias signals at two power levels, as indicated by a dash-dotted line. Specifically, bias power at a first level may be supplied in the first period (①), and bias power at a second level may be supplied in the fifth period (⑤) and the sixth period (⑥). In addition, no bias power may be supplied in the second period (②) to the fourth period (④).

The third graph from the top illustrates that the first FPMRFG 100-1 and the second FPMRFG 100-2 each supply RF power to the chamber 200 by performing multi-level pulsing and frequency modulation together. Specifically, in the case of the first FPMRFG 100-1, the RF power may be supplied at a frequency of 13 MHz in the first period (①), the RF power may be supplied at a frequency of 10 MHz in the second period (②) and the third period (③), and the RF power may be supplied at a frequency of 4 MHz in the fifth period (⑤) and the sixth period (⑥). In the case of the second FPMRFG 100-2, the RF power may be supplied at a frequency of 4 MHz in the first period (①), and the RF power may be supplied at a frequency of 2 MHz in the second period (②), the third period (③), the fifth period (⑤), and the sixth period (⑥).

The graph at the bottom illustrates that the third FPMRFG 100-3 and the fourth FPMRFG 100-4 each supply bias power to the chamber 200 by performing multi-level pulsing and frequency modulation together. Specifically, in the case of the third FPMRFG 100-3, the bias power may be supplied at a frequency of 13 MHz in the first period (①), the bias power may be supplied at a frequency of 2 MHz in the second period (②), and the bias power may be supplied at a frequency of 6 MHz in the third period (③), the fifth period (⑤), and the sixth period (⑥). In the case of the fourth FPMRFG 100-4, the bias power may be supplied at a frequency of 6 MHz in the first period (①), and the bias power may be supplied at a frequency of 2 MHz in the fifth period (⑤) and the sixth period (⑥).

In addition, in the case of the first FPMRFG 100-1 and the second FPMRFG 100-2, because no RF power is supplied in the fourth period (④), there is no need of frequency modulation. Likewise, in the fourth period (④) of the third FPMRFG 100-3 and in the second period (②) to the fourth period (④) of the fourth FPMRFG 100-4, because no RF power is supplied, there is no need of frequency modulation.

Figure 3A:
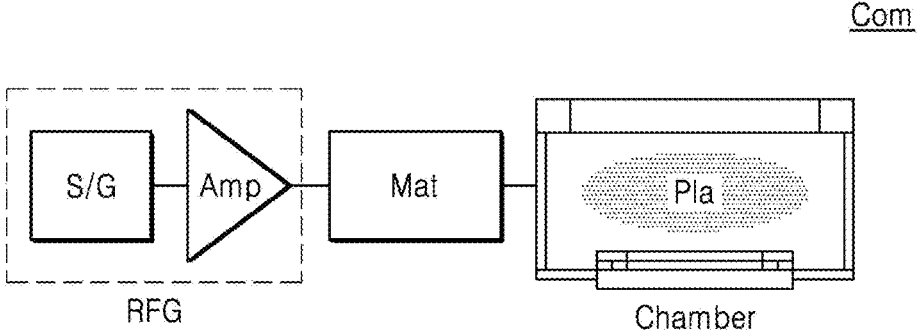
FIGS. 3A and 3B are configuration diagrams of an RF supply system according to a comparative example and a frequency and power modulation RF generator according to an embodiment, respectively.
Figure 3B:
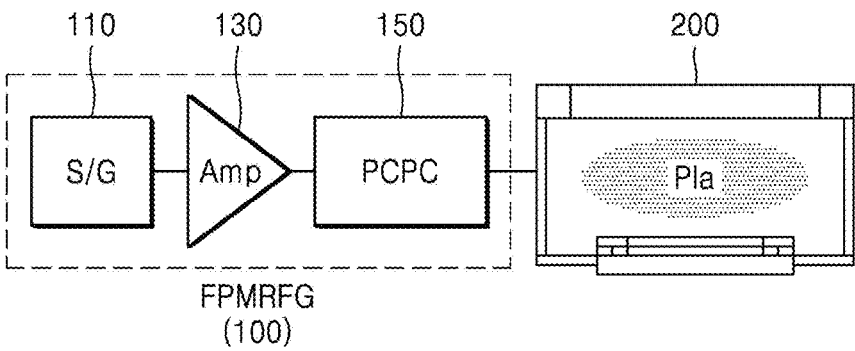
Figure 4A:
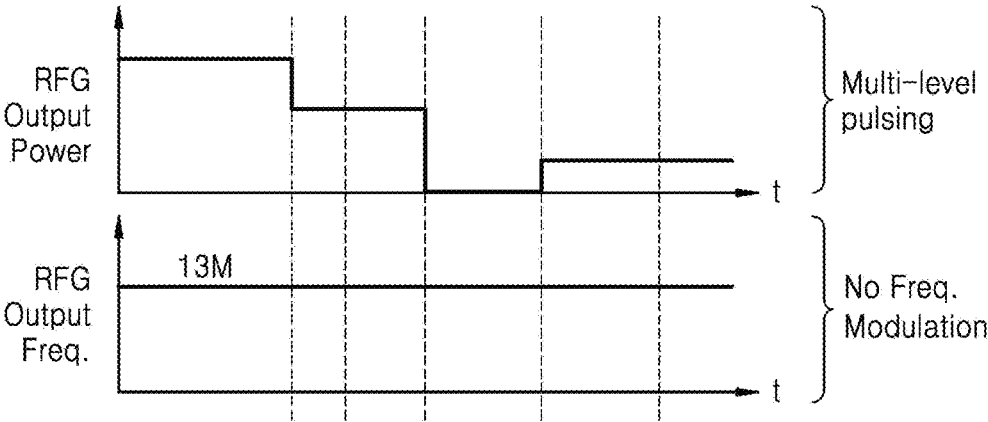
FIGS. 4A and 4B are graphs for power and frequency of RF signals supplied to chambers by the RF supply system of the comparative example of FIG. 3A and by the frequency and power modulation RF generator of the embodiment of FIG. 3B, respectively.
Figure 4B:
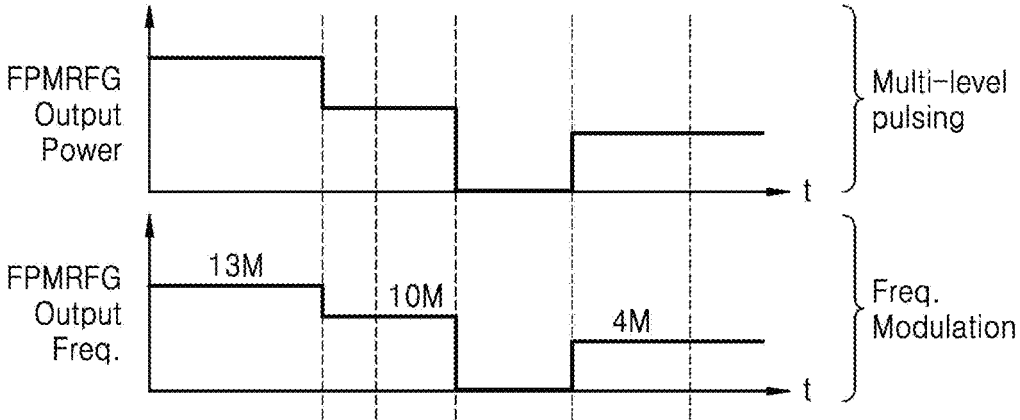

FIGS. 3A and 3B are configuration diagrams of an RF supply system according to a comparative example and an FPMRFG according to an embodiment, respectively, and FIGS. 4A and 4B are graphs for power and frequency of RF signals supplied to chambers by the RF supply system of the comparative example of FIG. 3A and by the FPMRFG of the embodiment of FIG. 3B, respectively. In FIGS. 4A and 4B, the x-axis represents time, and the y-axis represents power levels or frequency levels. Repeated descriptions given with reference to FIGS. 1 to 2B are simplified or omitted.

Referring to FIG. 3A, an RF supply system Com of the comparative example may include an RF generator RFG and a matcher Mat (i.e., an impedance matching circuit). In addition, the RF generator RFG may include a signal generator S/G and an amplifier Amp. The signal generator S/G and the amplifier Amp may be substantially identical to the signal generator 110 and the amplifier 130 of the FPMRFG 100 of FIG. 1, respectively. Therefore, detailed descriptions thereof are omitted. The matcher Mat may cause RF power from the RF generator RFG to be maximally transferred to the chamber by adjusting impedance. For example, the matcher Mat may adjust impedance to satisfy complex conjugate conditions, based on the maximum power delivery theory, thereby causing the RF power to be maximally transferred to the chamber. The RF supply system Com of the comparative example may include no PCPC unit.

Referring to FIG. 3B, the FPMRFG 100 of the present embodiment may be substantially identical to the FPMRFG 100 of FIG. 1. However, the controller 170 is omitted from FIG. 3B. In addition, although the RF supply system Com of the comparative example also includes a controller, the controller is omitted from FIG. 3A.

Referring to FIG. 4A, the RF supply system Com of the comparative example may supply RF power to the chamber by multi-level pulsing, as shown in the upper graph. However, as shown in the lower graph, the RF supply system Com of the comparative example does not perform frequency modulation. In the RF supply system Com of the comparative example, when the frequency modulation is performed, a phase difference between a voltage and a current may be generated in an RF signal, and the RF power may be reduced due to the phase difference. Therefore, in the RF supply system Com of the comparative example, the frequency modulation is not performed, or even when the frequency modulation is performed, the frequency modulation may be performed by as much as about 5% to about 10% at maximum for minimizing a loss in the RF power.

Referring to FIG. 4B, the FPMRFG 100 of the present embodiment may supply RF power to the chamber 200 while performing multi-level pulsing and frequency modulation together, as described above with reference to FIG. 2B. For example, the upper graph illustrates that the FPMRFG 100 of the present embodiment supplies RF power to the chamber 200 by multi-level pulsing, and this multi-level pulsing may be substantially identical to the multi-level pulsing of the FPMRFG 100-1 in the graph at the top in FIG. 2B. In addition, the lower graph illustrates that the FPMRFG 100 of the present embodiment supplies RF power to the chamber 200 by performing multi-level pulsing and frequency modulation together, and this frequency modulation may be substantially identical to the frequency modulation of the FPMRFG 100-1 in the third graph from the top in FIG. 2B.

FIG. 5 is a circuit diagram illustrating, in detail, a portion of a PCPC unit in the FPMRFG of FIG. 1. Repeated descriptions given with reference to FIGS. 1 to 4B are simplified or omitted.

Referring to FIG. 5, the FPMRFG 100 of the present embodiment may include a signal generator 110, an amplifier 130, a sensor 140, and a PCPC unit 150. The signal generator 110 and the amplifier 130 are the same as described regarding those of the FPMRFG 100 of FIG. 1. The sensor 140 may include a comparator. A voltage (that is, V), a current (that is, I), and a phase difference (that is, ΔV/I Phase) between the voltage and the current of an RF signal may be measured by the comparator. The sensor 140 may further include a voltage sensor and/or a current sensor. In an embodiment, the sensor 140 may supply the measured phase difference to the controller 170 so that the controller 170 may set a control signal to remove the phase difference.

The FPMRFG 100 of the present embodiment may measure the phase difference (that is, ΔV/I Phase) between the voltage and the current of the RF signal, which is generated through frequency modulation and multi-level pulsing, by using the sensor 140 and may control, via the PCPC unit 150, the phase difference (that is, ΔV/I Phase) to be 0, that is, may control the voltage and the current to be in-phase.

In the FPMRFG 100 of the present embodiment, the PCPC unit 150 may include a capacitor unit 152 and an inductor unit 154. The capacitor unit 152 may include a plurality of capacitors, which are connected between an output terminal of the amplifier 130 or the sensor 140 and the ground, and a plurality of switches connected to the capacitors. The inductor unit 154 may include a plurality of inductors, which are connected between the output terminal of the amplifier 130 or the sensor 140 and the chamber 200, and at least one switch connected to the inductors.

The capacitors of the capacitor unit 152 may include, for example, a first capacitor C1 and a second capacitor C2, which are connected to each other in series between a first node N1 and the ground, a third capacitor C3 that is variable and arranged between a second node N2 and the ground, and a fourth capacitor C4 that is variable and arranged between the first node N1 and the ground, the first node N1 being between the amplifier 130 or the sensor 140 and the inductor unit 154, and the second node N2 being between the first capacitor C1 and the second capacitor C2. In addition, the switches of the capacitor unit 152 may include, for example, a first switch S1 between the second node N2 and the ground, a second switch S2 between the third capacitor C3 and the ground, and a third switch S3 between the fourth capacitor C4 and the ground. However, circuit elements and a connection structure of the capacitor unit 152 are not limited to the circuit elements and the connection structure, which are described above.

The inductors of the inductor unit 154 may include, for example, a first inductor L1 and a second inductor L2, which are connected to each other in series between the first node N1 and the chamber 200. In addition, the at least one switch of the inductor unit 154 may include, for example, a fourth switch S4 between the first node N1 and a third node N3, the third node N3 being between the first inductor L1 and the second inductor L2. However, circuit elements and a connection structure of the inductor unit 154 are not limited to the circuit elements and the connection structure, which are described above.

In FIG. 5, Ceff under the capacitor unit 152 indicated by the dashed quadrangle may refer to the effective capacitance of the capacitor unit 152, and Leff under the inductor unit 154 indicated by the dashed quadrangle may refer to the effective inductance of the inductor unit 154. In the FPMRFG 100 of the present embodiment, the PCPC unit 150 may change the effective capacitance, Ceff, and the effective inductance, Leff, at high speed, with a wide variable range of impedance. For example, when the capacitor unit 152 includes a plurality of capacitors and the inductor unit 154 includes a plurality of inductors, the capacitors or the inductors may be selectively connected in series and/or in parallel via switches. Therefore, the capacitor unit 152 and the inductor unit 154 may have a wide variable range of impedance. In addition, the switches of the capacitor unit 152 and the inductor unit 154 include semiconductor switches using diodes and/or transistors and are capable of operating at high speed. Therefore, the PCPC unit 150 may widely change the effective capacitance, Ceff, and the effective inductance, Leff, at high speed through high-speed operations of the switches.

Figure 6A:
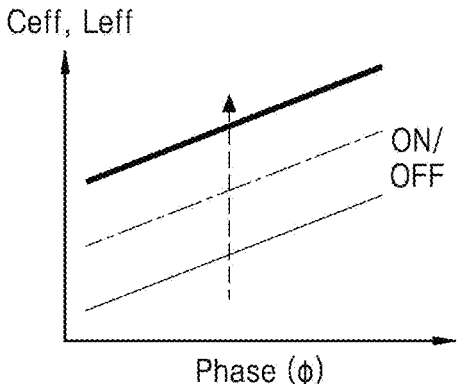
FIGS. 6A to 6C are graphs each illustrating operations of the PCPC unit in the frequency and power modulation RF generator of FIG. 1.
Figure 6B:
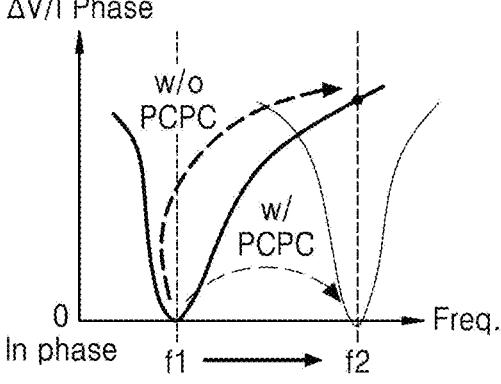
Figure 6C:
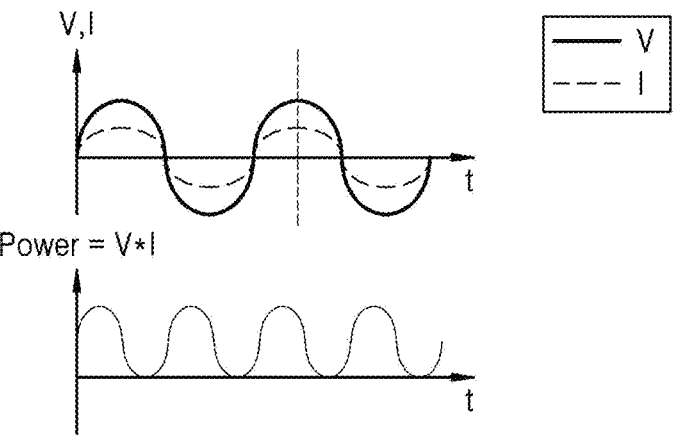

FIGS. 6A to 6C are graphs each illustrating operations of a PCPC unit in the FPMRFG 100 of FIG. 1. The PCPC unit may include the capacitor unit and the inductor unit of FIG. 5. In FIG. 6A, the x-axis represents a phase q of the second capacitor C2 and the y-axis represents the effective capacitance Ceff or the effective inductance Leff. In FIG. 6B, the x-axis represents frequencies and the y-axis represents phase differences (that is, ΔV/I Phase). In FIG. 6C, the x-axis represents time and the y-axis represents amplitudes or power.

Referring to FIG. 6A, FIG. 6A shows that, in the PCPC unit 150 of the FPMRFG 100 of the present embodiment, the effective capacitance Ceff or the effective inductance Leff may be changed by ON/OFF operations of the switches. In addition, as described above, the effective capacitance Ceff or the effective inductance Leff may have a wide variable range of impedance and may vary at high speed based on the semiconductor switches. In addition, in FIG. 6A, although the relationship between the effective capacitance Ceff or the effective inductance Leff and the phase φ is illustrated as a linear graph, this is only an example simplified for convenience of description, and the relationship may be nonlinear.

Referring to FIG. 6B, the thick-solid-line graph (that is, w/o PCPC) shows frequency change-dependent phase differences when there is no PCPC unit, and the thin-solid-line graph (that is, w/PCPC) shows frequency change-dependent phase differences changed by the PCPC unit. For example, the thick-solid-line graph (that is, w/o PCPC) may correspond to frequency change-dependent phase differences in the RF supply system Com of FIG. 3A according to the comparative example, and the thin-solid-line graph (that is, w/PCPC) may correspond to frequency change-dependent phase differences of the FPMRFG 100 according to the present embodiment. In a phase difference between a voltage and a current of the RF signal, the voltage and the current may respectively correspond to a voltage and a current of the RF signal that is output from the amplifier 130, and this may be equally applied to a phase difference between a voltage and a current in other figures described below.

In general, when there is a change in a frequency such as a decrease or increase in the frequency, a phase difference between a voltage and a current is generated. For example, at a first frequency f1, when a phase difference between a voltage and a current is 0, that is, the voltage and the current are in-phase, an increase from the first frequency f1 to a second frequency f2 may result in an increase in the phase difference in the case where there is no PCPC unit, as indicated by the thick dashed arrow in the thick-solid-line graph (that is, w/o PCPC). However, in the case where there is a PCPC unit, the phase difference may be intactly 0, that is, the voltage and the current may be in-phase, at the second frequency f2, as indicated by the thin dashed arrow. A graph for frequency change-dependent phase differences may be changed to the thin-solid-line graph by adjusting the effective capacitance and the effective inductance in the PCPC unit, thereby causing the phase difference between the voltage and the current at the second frequency f2 to be 0.

For reference, in an RLC circuit, a change in resistance R does not affect the phase difference, an increase in inductance L may result in the phase advance of the voltage, and an increase in capacitance C may result in the phase advance of the current. Therefore, by appropriately adjusting the effective capacitance and the effective inductance in the PCPC unit, the phase difference between the voltage and the current may be 0.

Referring to FIG. 6C, in the upper graph, the solid line represents a voltage (that is, V), the dashed line represents a current (that is, I), and it is shown that the voltage (that is, V) and the current (that is, I) are in-phase. The lower graph is a graph for power corresponding to the upper graph. Each of the voltage and the current is a vector, and the power is a scalar as the product of the voltage and the current. Therefore, when the voltage and the current are in-phase, the power may be maximum.

Figure 7:
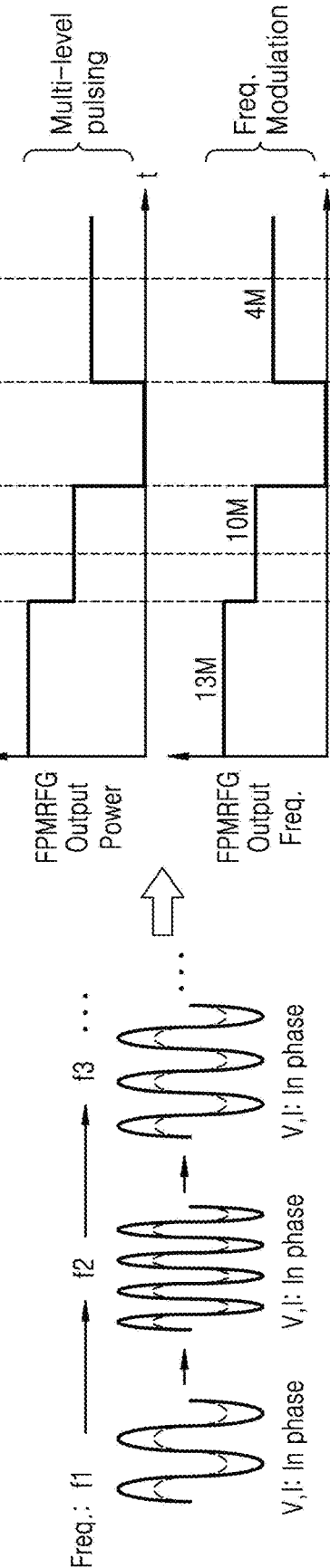
FIG. 7 illustrates a conceptual diagram and a graph, both showing an operation in which RF signals with different frequencies are controlled to be in-phase and are applied to multi-level pulsing by the PCPC unit of FIG. 6C.

FIG. 7 illustrates a conceptual diagram and a graph, both showing an operation in which RF signals with different frequencies are controlled to be in-phase and are applied to multi-level pulsing by the PCPC unit.

Referring to FIG. 7, as shown in the left, in the FPMRFG 100 of the present embodiment, even when a modulation is made from a first frequency f1 to a second frequency f2 or from the second frequency f2 to a third frequency f3, a phase difference between a voltage (that is, V) and a current (that is, I) may be 0, that is, the voltage (that is, V) and the current (that is, I) may be in-phase, by the PCPC unit. Therefore, the FPMRFG 100 of the present embodiment may supply RF power to a chamber by performing frequency modulation as shown in the right-lower graph even while performing multi-level pulsing as shown in the right-upper graph. For example, according to frequency forms in the left of FIG. 7, the second frequency f2 may correspond to 13 MHz, the third frequency f3 may correspond to 10 MHz, and the first frequency f1 may correspond to 4 MHz.

Figure 8A:
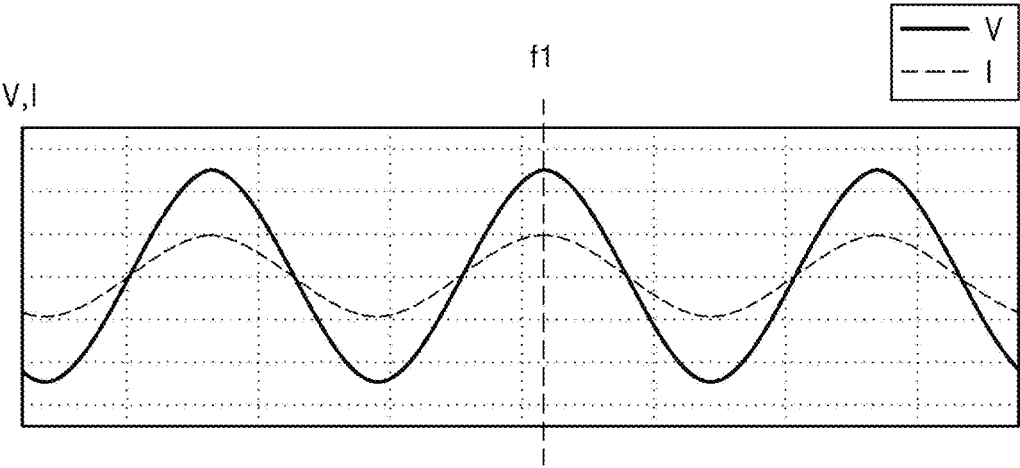
FIGS. 8A to 8C are graphs each illustrating phase changes and power according to whether there is a PCPC unit of a frequency and power modulation RF generator according to an embodiment, when an RF signal is modulated from a first frequency to a second frequency.
Figure 8A:
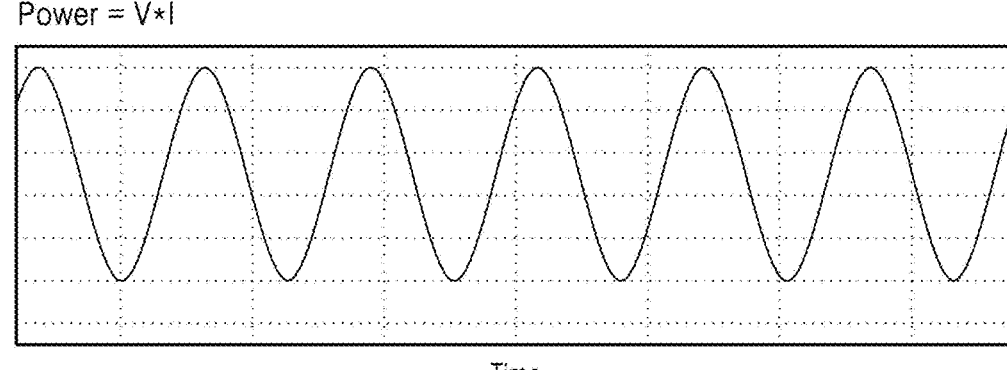
Figure 8B:
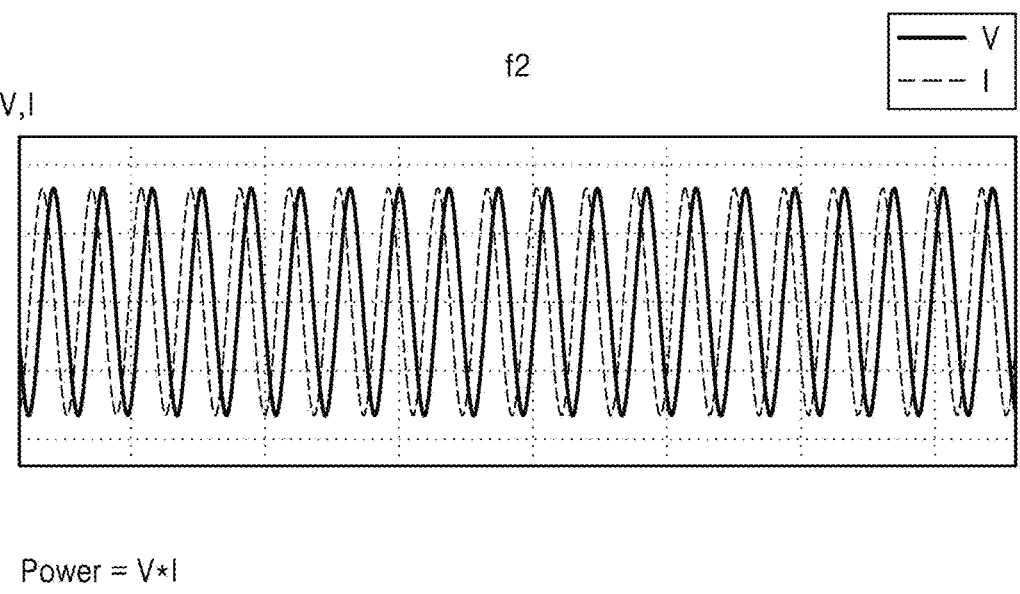
Figure 8C:
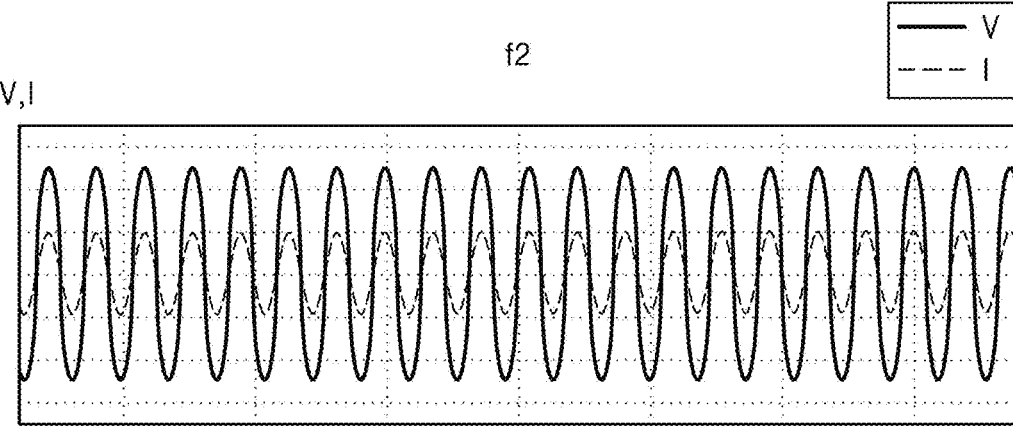
Figure 8C:
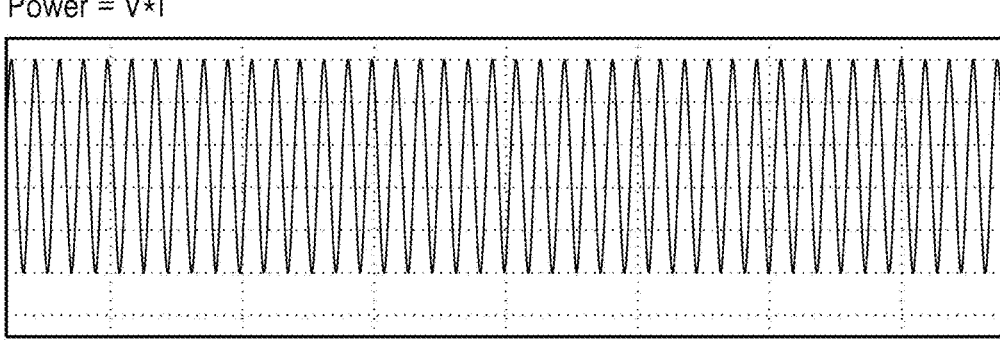

FIGS. 8A to 8C are graphs each illustrating phase changes and power depending on whether there is a PCPC unit of an FPMRFG according to an embodiment, when an RF signal is modulated from a first frequency to a second frequency. In particular, FIG. 8B is a graph illustrating phase changes and power when there is no PCPC unit, and FIG. 8C is a graph illustrating phase changes and power when there is a PCPC unit. In FIGS. 8A to 8C, the x-axis represents time, and the y-axis represents amplitudes or power.

Referring to FIG. 8A, the upper graph shows a voltage (that is, V) and a current (that is, I), which are in-phase, at a first frequency f1. The lower graph shows power corresponding to the upper graph. Here, the first frequency f1 may be, for example, a frequency that is less than 10 MHz.

Referring to FIG. 8B, the upper graph shows a voltage (that is, V) and a current (that is, I) in the case where the first frequency f1 is modulated to a second frequency f2, when there is no PCPC unit. The lower graph shows power corresponding to the upper graph. As can be seen from the upper graph, it can be seen that there is a phase difference between the voltage (that is, V) and the current (that is, I) at the second frequency f2. Therefore, the power may be less than a maximum value thereof. Here, the second frequency f2 may be higher than the first frequency f1. For example, the second frequency f2 may be a frequency that is higher than 10 MHz.

Referring to FIG. 8C, the upper graph shows a voltage (that is, V) and a current (that is, I) in the case where the first frequency f1 is modulated to the second frequency f2, when there is a PCPC unit. The lower graph shows power corresponding to the upper graph. As can be seen from the upper graph, it can be seen that there is no phase difference between the voltage (that is, V) and the current (that is, I) even at the second frequency f2. That is, even at the second frequency f2, the voltage (that is, V) and the current (that is, I) may be in-phase. Therefore, the power may have a maximum value.

Figure 9A:
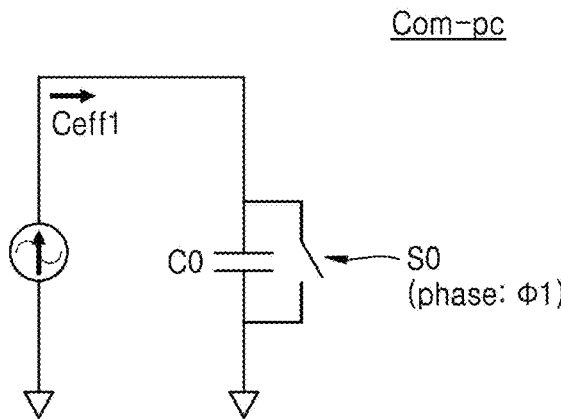
FIGS. 9A and 9B are respectively a phase control circuit according to a comparative example and a phase control circuit of a frequency and power modulation RF generator according to an embodiment.
Figure 9B:
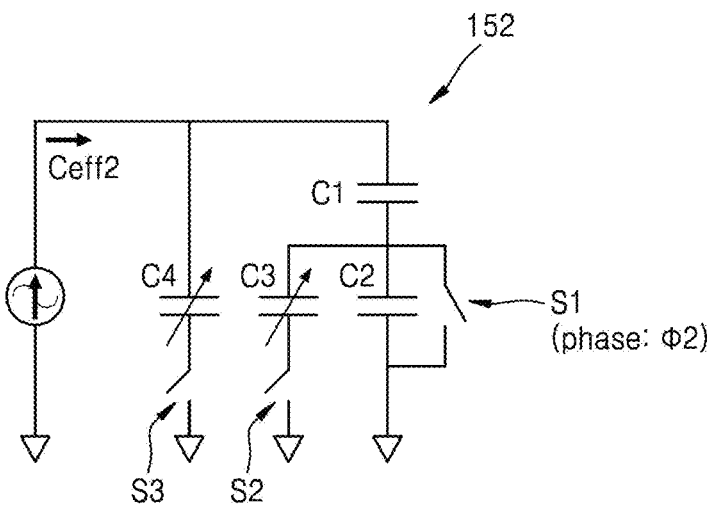

FIGS. 9A and 9B are respectively a phase control circuit according to a comparative example and a phase control circuit of an FPMRFG according to an embodiment.

Referring to FIGS. 9A and 9B, a phase control circuit Com-pc of the comparative example may include one capacitor C0 and one switch S0 and may have a first effective capacitance Ceff1. On the other hand, in the FPMRFG 100 of the present embodiment, the phase control circuit may include the capacitor unit 152 of the PCPC unit 150. In addition, the phase control circuit may have a second effective capacitance Ceff2.

FIGS. 10A to 10D are graphs illustrating phase changes by the phase control circuit according to the comparative example of FIG. 9A and graphs illustrating phase changes by the FPMRFG according to the embodiment of FIG. 9B. In FIGS. 10A to 10D, the x-axis represents phases in units of degrees, and the y-axis represents capacitance.

Figure 10A:
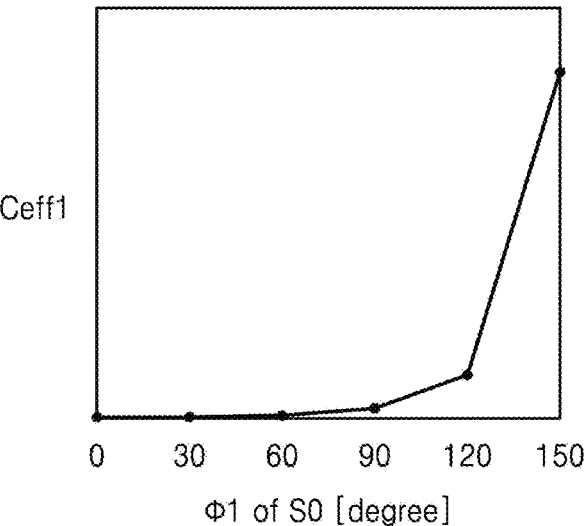
FIGS. 10A to 10D are graphs illustrating phase changes by the phase control circuit according to the comparative example of FIG. 9A and graphs illustrating phase changes by the frequency and power modulation RF generator according to the embodiment of FIG. 9B.

Referring to FIG. 10A, in the case of the phase control circuit Com-pc of the comparative example, the slope of the first effective capacitance Ceff1 depending on a phase $\varphi1$ may sharply change. In addition, high voltage stress acts on the switch S0, and thus, it is not able to apply a semiconductor switch to the switch S0. Consequently, in the case of the phase control circuit Com-pc of the comparative example, it may be difficult to change the first effective capacitance Ceff1 at high speed.

Figure 10B:
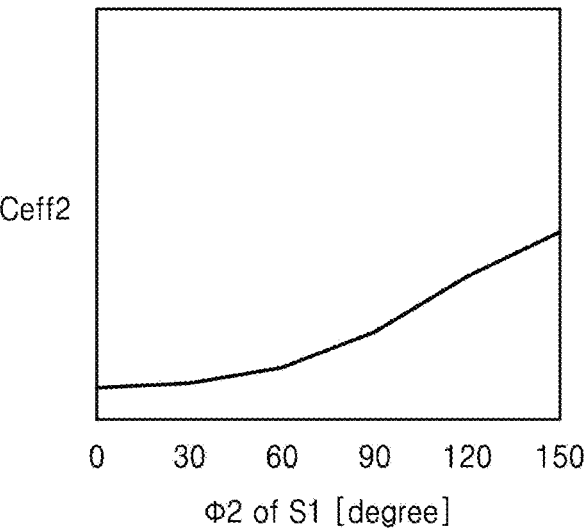

Referring to FIG. 10B, in the case of the phase control circuit of the FPMRFG 100 of the present embodiment, due to serial connections and/or parallel connections of the plurality of capacitors, the slope of the second effective capacitance Ceff2 depending on a phase $\varphi2$ may be gentle and thus be almost a linear slope. In addition, because low voltage stress acts on the second and third switches S2 and S3 as well as the first switch S1, it is able to apply a semiconductor switch to each thereof. Therefore, in the case of the phase control circuit of the FPMRFG 100 of the present embodiment, it is able to change the second effective capacitance Ceff2 at high speed. For reference, a voltage Vs1 applied to the first switch S1 may be calculated by $V \cdot (Z2+Z3)/(Z1+Z2+Z3)$. Here, V may correspond to a voltage applied to the switch S0 in the phase control circuit Com-pc of the comparative example, and Z1, Z2, and Z3 may respectively correspond to impedances of the first, second, and third capacitors C1, C2, and C3.

Figure 10C:
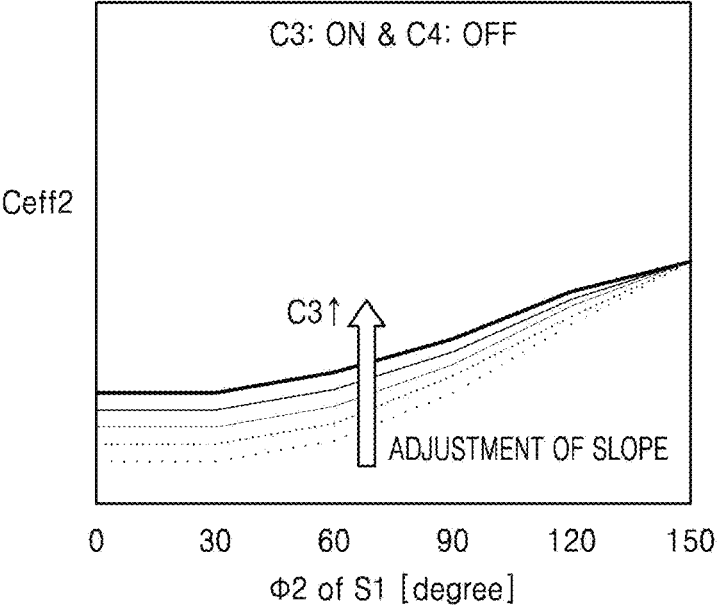

Referring to FIG. 10C, by ON/OFF of the second switch S2, the slope (that is, $d(Ceff2)/d(\varphi2)$) of the second effective capacitance Ceff2 with respect to the phase $\varphi2$ may be adjusted. The graph of FIG. 10C shows that, by turning on the second switch S2 and increasing the capacitance value of the third capacitor C3, the slope of the second effective capacitance Ceff2 with respect to the phase $\varphi2$ may be precisely adjusted.

Figure 10D:
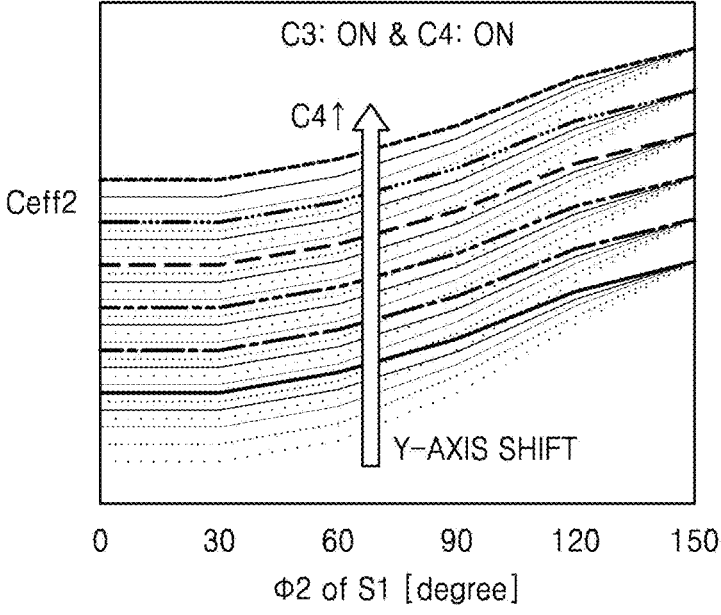

Referring to FIG. 10D, by ON/OFF of the third switch S3, the value of the second effective capacitance Ceff2 may be adjusted over a wide range. The graph of FIG. 10D shows that, by turning on the third switch S3 and increasing the capacitance value of the fourth capacitor C4, the second effective capacitance Ceff2 may be shifted along the y-axis, thereby controlling the value of the second effective capacitance Ceff2 in a wide range.

Figure 11A:
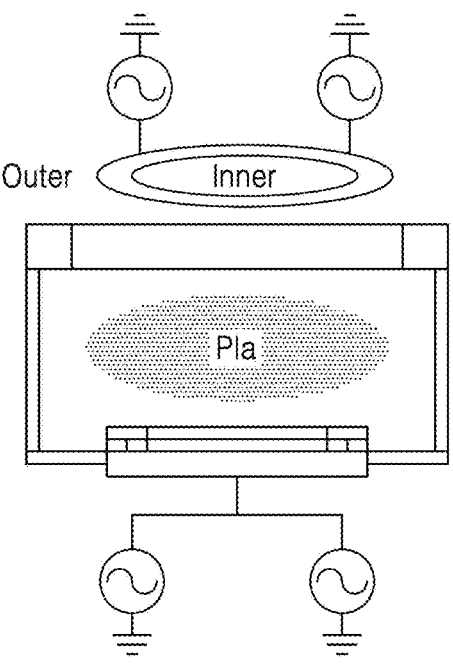
FIGS. 11A to 11C are respectively a configuration diagram of a chamber system to which an RF generator according to a comparative example or a frequency and power modulation RF generator according to an embodiment is applied, and simulation pictures showing distributions of plasma in a chamber.
Figure 11B:
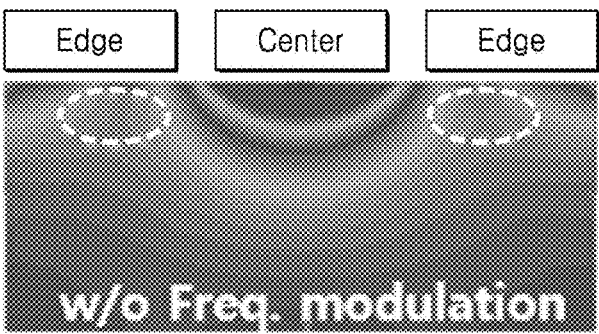
Figure 11C:
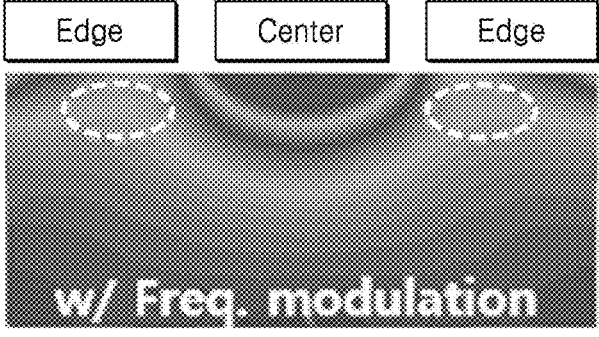

FIGS. 11A to 11C are respectively a configuration diagram of a chamber system to which an RF generator according to a comparative example or an FPMRFG according to an embodiment is applied, and simulation pictures showing distributions of plasma in a chamber.

Referring to FIG. 11A, in the configuration diagram of the chamber system, four RF sources connected to the chamber may each include the RF generator of the comparative example or the FPMRFG 100 of the present embodiment.

Referring to FIG. 11B, when the RF sources connected to the chamber each include the RF generator of the comparative example, plasma generated in the chamber may have low uniformity. For example, in an area indicated by the dashed circle in FIG. 11B, the density of the plasma may be relatively low.

Referring to FIG. 11C, when the RF sources connected to the chamber each include the FPMRFG 100 of the present embodiment, plasma generated in the chamber may have high uniformity. For example, in an area indicated by the dashed circle in FIG. 11C, the density of the plasma is similar to that in a surrounding area, and thus, the uniformity of the plasma in the chamber may improve on the whole.

While the inventive concept has been particularly shown and described with reference to embodiments thereof, it will be understood that various changes in form and details may be made therein without departing from the spirit and scope of the following claims.

What is claimed is:

1. A frequency and power modulation radio frequency (RF) generator comprising:

a first frequency and power modulation RF generator including:

a signal generator configured to generate an RF signal;

an amplifier configured to amplify power of the RF signal generated by the signal generator; and a phase controlled power correction (PCPC) circuit configured to control a phase of the RF signal amplified by the amplifier, wherein the signal generator, the amplifier, and the PCPC circuit are controlled to perform multi-level pulsing and frequency modulation on the RF signal, thereby supplying RF power of the RF signal to a chamber, and wherein the multi-level pulsing has pulse forms with different power levels.

2. The frequency and power modulation RF generator of claim 1, wherein the PCPC circuit comprises a capacitor, an inductor, and a switch.

3. The frequency and power modulation RF generator of claim 2, wherein the switch comprises a semiconductor switch.

4. The frequency and power modulation RF generator of claim 1, wherein the PCPC circuit comprises:

a capacitor unit comprising a plurality of capacitors, which are connected between an output terminal of the amplifier and a ground, and a plurality of switches connected to the plurality of capacitors; and an inductor unit comprising a plurality of inductors and at least one switch connected to the plurality of inductors, the plurality of inductors being connected between the output terminal of the amplifier and the chamber.

5. The frequency and power modulation RF generator of claim 4, wherein a voltage and a current of the RF signal supplied to the chamber are in-phase through adjustment of an effective capacitance of the plurality of capacitors using ON/OFF operations of the plurality of switches and an effective inductance of the plurality of inductors using ON/OFF operations of the at least one switch.

6. The frequency and power modulation RF generator of claim 4, wherein the capacitor unit comprises:

a first capacitor and a second capacitor, which are connected to each other in series between a first node and the ground, the first node being between the amplifier and the inductor unit;

a third capacitor, which is a variable capacitor and arranged between a second node and the ground, the second node being between the first capacitor and the second capacitor;

a fourth capacitor, which is a variable capacitor and arranged between the first node and the ground;

a first switch between the second node and the ground;

a second switch between the third capacitor and the ground; and a third switch between the fourth capacitor and the ground.

7. The frequency and power modulation RF generator of claim 6, wherein an effective capacitance of the capacitor unit and a slope of the effective capacitance with respect to the phase of the RF signal are adjusted through ON/OFF operations of the first to third switches.

8. The frequency and power modulation RF generator of claim 4, wherein the inductor unit comprises:

a first inductor and a second inductor, which are connected to each other in series between the amplifier and the chamber; and a fourth switch between a first node and a third node, the first node being between the amplifier and the inductor unit, and the third node being between the first inductor and the second inductor.

9. The frequency and power modulation RF generator of claim 1, further comprising a controller configured to generate a control signal, wherein the control signal includes waveform information of the phase of the RF signal, a frequency thereof, an amplitude thereof, or a gain of the amplifier, the signal generator is configured to generate the RF signal according to waveform information of at least one of the phase, the frequency, and the amplitude of the control signal, and the amplifier is configured to amplify the power of the RF signal according to waveform information of the gain of the control signal.

10. The frequency and power modulation RF generator of claim 1, further comprising a sensor between the amplifier and the PCPC circuit, wherein the sensor comprises a comparator and is configured to detect a phase difference between a voltage of the RF signal and a current of the RF signal.

11. The frequency and power modulation RF generator of claim 1, further comprising:

a second frequency and power modulation RF generator, a third frequency and power modulation RF generator, and a fourth frequency and power modulation RF generator, wherein the first and second frequency and power modulation RF generators are respectively connected to an inner antenna and an outer antenna and are configured to supply first source power and second source power to the chamber, respectively, wherein the inner antenna and the outer antenna are arranged in an upper portion of the chamber, and wherein the third and fourth frequency and power modulation RF generators are connected to an electrostatic chuck of the chamber and are configured to supply first bias power and second bias power to the electrostatic chuck, respectively.

12. A frequency and power modulation radio frequency (RF) generator comprising:

a controller configured to generate a control signal;

a signal generator configured to generate an RF signal according to the control signal of the controller;

an amplifier configured to amplify power of the RF signal generated by the signal generator according to a gain information of the control signal of the controller;

a phase controlled power correction (PCPC) circuit configured to control a phase of the RF signal amplified by the amplifier; and a sensor arranged between the amplifier and the PCPC circuit and configured to detect a phase difference between a voltage of the RF signal and a current thereof, wherein the controller is configured to cause the signal generator, the amplifier, and the PCPC circuit to perform multi-level pulsing and frequency modulation on the RF signal.

13. The frequency and power modulation RF generator of claim 12, wherein the PCPC circuit comprises a capacitor, an inductor, and a switch.

14. The frequency and power modulation RF generator of claim 12, wherein the PCPC circuit comprises:

a capacitor unit comprising a plurality of capacitors and a plurality of switches connected to the plurality of capacitors, the plurality of capacitors being connected between an output terminal of the amplifier and a ground; and an inductor unit comprising a plurality of inductors and at least one switch connected to the plurality of inductors, the plurality of inductors being connected between the output terminal of the amplifier and a chamber.

15. The frequency and power modulation RF generator of claim 14, wherein a voltage and a current of the RF signal supplied to the chamber are in-phase through adjustment of an effective capacitance of the plurality of capacitors using ON/OFF operations of the plurality of switches and an effective inductance of the plurality of inductors using ON/OFF operations of the at least one switch.

16. The frequency and power modulation RF generator of claim 15, wherein the capacitor unit comprises:

a first capacitor and a second capacitor, which are connected with each other in series between a first node and the ground, the first node being between the amplifier and the inductor unit;

a third capacitor between a second node and the ground, the second node being between the first capacitor and the second capacitor;

a fourth capacitor between the first node and the ground;

a first switch between the second node and the ground;

a second switch between the third capacitor and the ground; and a third switch between the fourth capacitor and the ground.

17. The frequency and power modulation RF generator of claim 15, wherein the inductor unit comprises:

a first inductor and a second inductor, which are connected with each other in series between the amplifier and the chamber; and a fourth switch between a first node and a third node, the first node being between the amplifier and the inductor unit, and the third node being between the first inductor and the second inductor.

18. Plasma equipment comprising:

a chamber; and a first frequency and power modulation radio frequency (RF) generator connected to the chamber, wherein the first frequency and power modulation RF generator comprises:

a controller configured to generate a control signal;

a signal generator configured to generate an RF signal according to the control signal of the controller;

an amplifier configured to amplify power of the RF signal generated by the signal generator according to a gain information of the control signal of the controller;

a phase controlled power correction (PCPC) circuit comprising a capacitor, an inductor, and a switch and configured to control a voltage and a current of the RF signal, which is amplified by the amplifier, to have a same phase; and a sensor arranged between the amplifier and the PCPC circuit and configured to detect a phase difference between the voltage and the current, and wherein the controller is configured to cause the signal generator, the amplifier, and the PCPC circuit to perform multi-level pulsing and frequency modulation on the RF signal, thereby supplying RF power of the RF signal to the chamber.

19. The plasma equipment of claim 18, wherein the PCPC circuit comprises:

a capacitor unit comprising a plurality of capacitors and a plurality of switches connected to the plurality of capacitors, the plurality of capacitors being connected between an output terminal of the amplifier and a ground; and an inductor unit comprising a plurality of inductors and at least one switch connected to the plurality of inductors, the plurality of inductors being connected between the output terminal of the amplifier and the chamber, and wherein a voltage and a current of the RF signal supplied to the chamber are in-phase through adjustment of an effective capacitance of the plurality of capacitors using ON/OFF operations of the plurality of switches and an effective inductance of the plurality of inductors using ON/OFF operations of the at least one switch.

20. The plasma equipment of claim 18, further comprising: a second frequency and power modulation RF generator, a third frequency and power modulation RF generator, and a fourth frequency and power modulation RF generator, wherein the first and second frequency and power modulation RF generators are respectively connected to an inner antenna and an outer antenna and are configured to supply first source power and second source power to the chamber, respectively, wherein the inner antenna and the outer antenna are arranged in an upper portion of the chamber, and wherein the third and fourth frequency and power modulation RF generators are connected to an electrostatic chuck of the chamber and are configured to supply first bias power and second bias power to the electrostatic chuck, respectively.

\* \* \* \* \*